(12) United States Patent
Milroy et al.

(10) Patent No.: US 10,180,198 B2
(45) Date of Patent: Jan. 15, 2019

(54) FLAPPER-MOUNTED BUFFER TO CUSHION CHECK VALVE CLOSURE

(71) Applicant: Mueller International, LLC, Atlanta, GA (US)

(72) Inventors: Jeff Milroy, Glen Ellyn, IL (US); Stephen J. Smick, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/617,666

(22) Filed: Jun. 8, 2017

(65) Prior Publication Data

US 2018/0356001 A1    Dec. 13, 2018

(51) Int. Cl.
*F16K 47/02*    (2006.01)
*F16K 15/03*    (2006.01)

(52) U.S. Cl.
CPC .......... *F16K 47/023* (2013.01); *F16K 15/033* (2013.01)

(58) Field of Classification Search
CPC ...... F16K 47/04; F16K 15/03; Y10T 137/785; E03F 7/04; E03C 1/104
USPC ............................................. 251/85, 48, 285
See application file for complete search history.

(56) References Cited

U.S. PATENT DOCUMENTS

| | | | | |
|---|---|---|---|---|
| 580,294 A * | 4/1897 | Stone | ...................... | F16K 19/00 137/512.1 |
| 1,388,246 A * | 8/1921 | Elliott | ................... | F16K 1/2007 251/228 |
| 2,285,324 A * | 6/1942 | Bennett | ................. | F16K 15/181 251/228 |
| 2,514,838 A * | 7/1950 | Callahan | ................. | F16K 15/03 137/517 |
| 3,098,502 A * | 7/1963 | Deve | ........................ | F16K 47/00 137/514 |
| 4,249,568 A * | 2/1981 | Duggan | .................. | E03C 1/104 137/107 |
| 4,330,006 A * | 5/1982 | Eck | ......................... | F16K 15/03 137/514 |
| 5,078,363 A * | 1/1992 | Gregory | .................... | F16K 1/24 251/144 |
| 6,050,294 A | 4/2000 | Makowan | | |
| 7,422,029 B2 * | 9/2008 | Denike | .................. | B64D 13/02 137/512.1 |

OTHER PUBLICATIONS

Definition of "Bore" from Merriam-Webster; https://www.merriam-webster.com/dictionary/bore.*

(Continued)

*Primary Examiner* — Reinaldo Sanchez-Medina
*Assistant Examiner* — Nicole Gardner
(74) *Attorney, Agent, or Firm* — Taylor English Duma LLP

(57) ABSTRACT

A check valve for a fluid system includes: a valve body defining an inlet, an outlet, and an interior cavity; a closing member positioned inside the interior cavity, the closing member movable between an open position, providing fluid communication between the inlet and outlet, and a closed position, isolating the inlet from the outlet; and a buffer mounted on the closing member, the buffer configured to hold a portion of fluid in the fluid system and cushion movement of the closing member from the open position to the closed position.

22 Claims, 10 Drawing Sheets

(56) References Cited

OTHER PUBLICATIONS

APCO; Operation and Maintenance Instructions for Slanting Disc Check Valve with Bottom Mounted Buffer, publicly available prior to Jun. 8, 2017, 4 pgs.
APCO; Specification Sheet for Rubber Flapper Check Valve with Spring Return Attachment, dated Oct. 24, 2006, 2 pgs.
DeZurik; Brochure entitled "Pressure Temperature Ratings Guide", May 2009, 4 pgs.
DeZurik; Brochure for APCO CSD-800 Slanting Disc Check Valves, Mar. 2014, 19 pgs.
Valmatic; Brochure for Surgerbuster Check Valves, copyright 2013, 8 pgs.
Milroy, Jeff; Non-Final Office Action for U.S. Appl. No. 15/617,674, filed Jun. 8, 2017, dated Aug. 9, 2018, 20 pgs.
Milroy, Jeff; Application Initiated Interview Summary for U.S. Appl. No. 15/617,674, filed Jun. 8, 2017, dated Nov. 13, 2018, 2 pgs.

* cited by examiner

FLAPPER-MOUNTED BUFFER TO CUSHION CHECK VALVE CLOSURE

TECHNICAL FIELD

Field of Use

This disclosure relates to valves. More specifically, this disclosure relates to check valves for regulating fluid flow.

Related Art

In a fluid system that transports a fluid from one location to another, it can be desirable to allow the fluid to flow in only one direction. A check valve, a type of valve that typically allows fluid flow in only one direction, typically comprises a closing member that is configured to cover an internal opening in the valve to close the valve and to move away from the internal opening to open the valve. When a pump positioned upstream from a check valve in such a fluid system shuts down, any delay between when the pump stops pushing the fluid and when the check valve is fully closed can allow the fluid to flow in reverse. Reverse flow can cause the closing member to slam closed, creating noise and vibration in the piping system due to the resulting pressure spike sometimes described as "water hammer," which can potentially damage the closing member and other fluid system components upstream from the check valve over long periods of use.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a check valve for a fluid system, the check valve comprising: a valve body defining an inlet, an outlet, and an interior cavity extending from the inlet to the outlet; a flapper positioned inside the interior cavity, the flapper movable between an open position, providing fluid communication between the inlet and outlet, and a closed position, isolating the inlet from the outlet; a rod positioned at least partially inside the valve body and comprising a first end proximate to the flapper and a second end distal from the first end, the rod positioned at an angle with respect to the flapper, a distance from the first end of the rod to the flapper adjustable by manipulation of the second end of the rod from outside the valve body, an axially outermost portion of the first end of the rod relative to an axis defined by the rod facing an upstream surface of the flapper; and a buffer mounted on the flapper, the buffer configured to hold a portion of fluid in the fluid system and cushion movement of the flapper from an open position to a closed position when the flapper is proximate to the closed position.

In a further aspect, disclosed is a check valve for a fluid system, the check valve comprising: a valve body defining an inlet, an outlet, and an interior cavity; a closing member positioned inside the interior cavity, the closing member movable between an open position, providing fluid communication between the inlet and outlet, and a closed position, isolating the inlet from the outlet; and a buffer mounted on the closing member, the buffer configured to hold a portion of fluid in the fluid system and cushion movement of the closing member from the open position to the closed position.

In yet another aspect, disclosed is a method of using a check valve in a fluid system comprising a fluid, the method comprising: moving a closing member positioned inside an interior cavity of the check valve toward an open position, the open position providing fluid communication between an inlet and an outlet of the check valve, the check valve comprising a valve body defining the inlet, the outlet, and the interior cavity; moving the closing member of the check valve toward a closed position; and stopping movement of the closing member when the closing member is in a position proximate to the closed position with a buffer configured to hold a portion of the fluid and mounted on the closing member.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures can be designated by matching reference characters for the sake of consistency and clarity.

DETAILED DESCRIPTION

Figure 1:
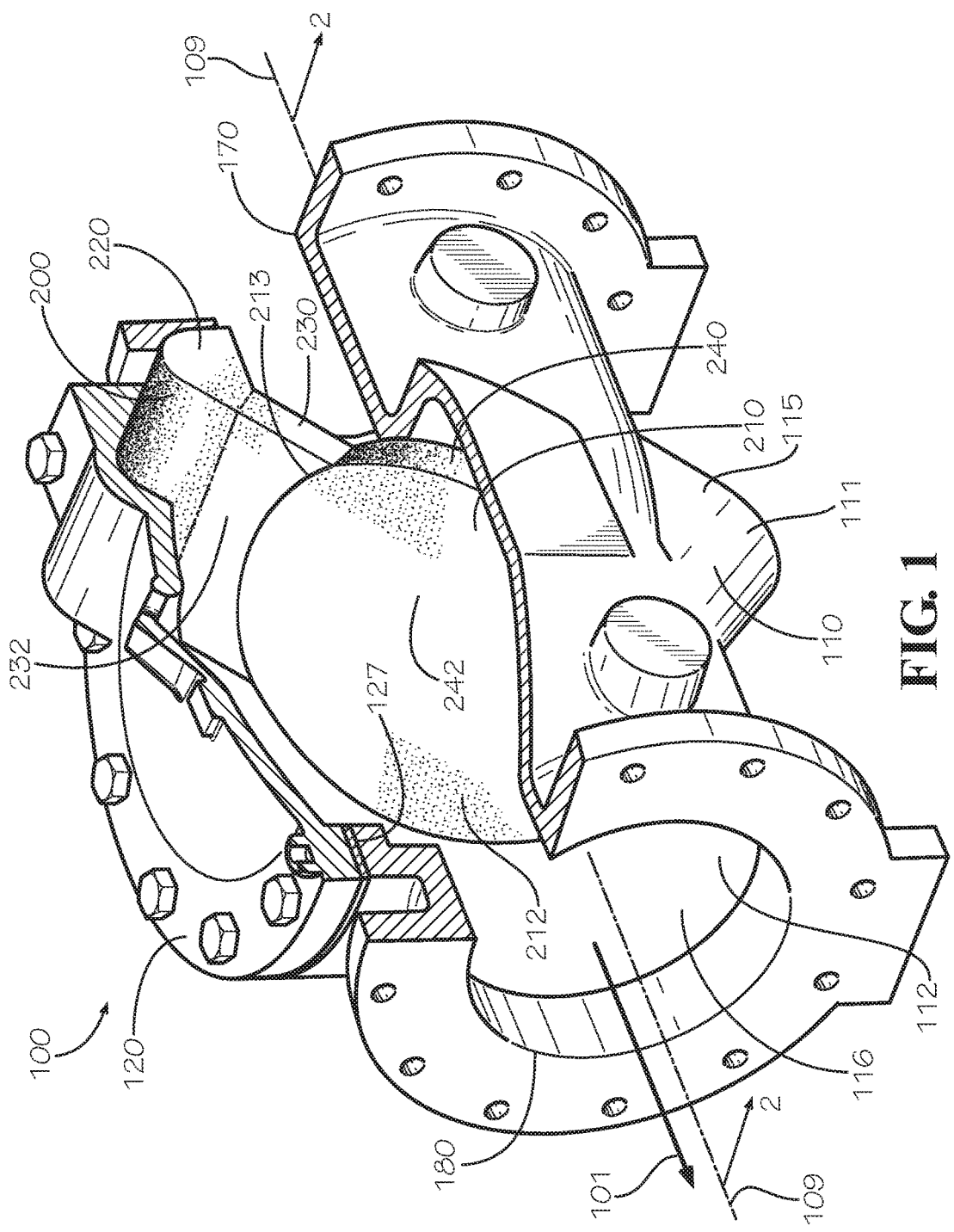
FIG. 1 is perspective cut-away view of a check valve comprising a flapper in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a check valve and associated methods, systems, devices, and various apparatuses are described herein. The check valve can comprise a closing member such as a flapper or a disc. The check valve can further comprise a surge suppressor comprising a buffer, which can function as a cushioning device. In one aspect, the check valve disclosed herein can be, for example and without limitation, a full flow valve in which the flow area is equal to or greater than the equivalent pipe size throughout. In another aspect, the check valve disclosed herein can be a partial flow valve in which the flow area is less than the equivalent pipe size throughout. A "check valve" can be not only a valve described as a check valve such as a flapper check valve but also any valve that regulates flow of a fluid including, for example and without limitation, swing check valves and tilting or slanting disc check valves, such as configured with or without a bottom buffer.

Various materials can be used to fabricate the various components of the check valve 100. The disclosure of the specific materials or finishes or types of materials or finishes listed, however, is not intended to be limiting on the current disclosure. One of ordinary skill in the art would know to substitute equivalent materials where appropriate.

Figure 2:
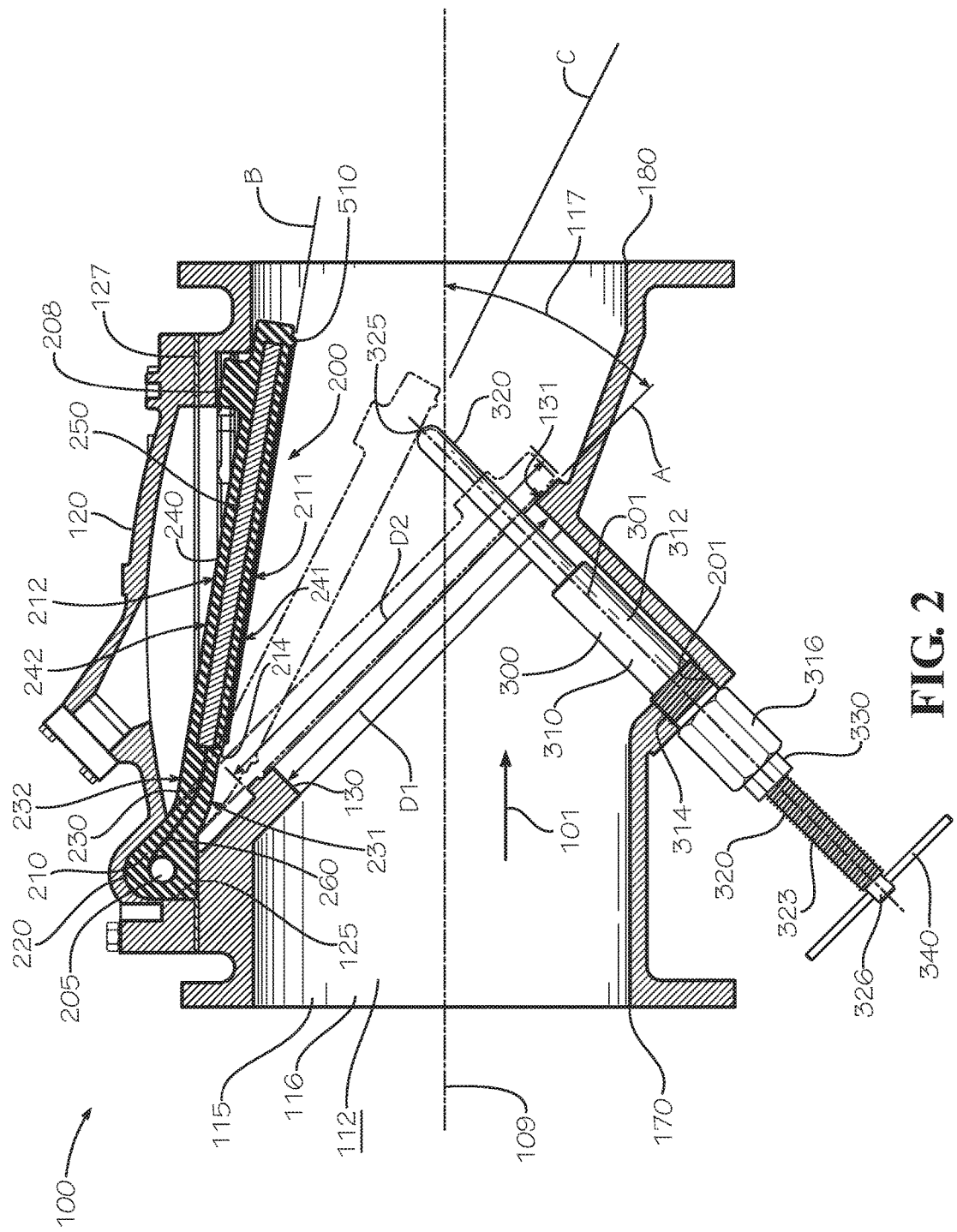
FIG. 2 is a sectional view of the check valve of FIG. 1 taken along line 2-2 of FIG. 1 in accordance with another aspect of the current disclosure wherein the flapper comprises a hinge pin and a buffering device.

In one aspect, as shown in FIGS. 1 and 2, a check valve 100 can comprise a valve body 110 and a closing member 200, which can define a primary flow direction 101. The valve body 110 can define an inlet 170, an outlet 180, an outer surface 111, and an interior cavity 116 defining an inner surface 112. The inner surface 112 can be coated with an epoxy film or other coating to prevent the fluid in the valve from contacting the material used to form the valve body 110.

As shown in FIG. 2, the valve body can define a port 130 in the interior cavity 116 comprising a circumferential downstream port shoulder surface 131 against which a rib 510 of a resilient body 210 of the closing member 200 can contact. The port shoulder surface 131 of the port 130 of the valve body 110 can define an inside diameter D1 and an outside diameter D2. The valve body 110 can comprise an inlet flange defining mounting holes and an outlet flange defining mounting holes. The check valve 100 can further define an access port 201 configured to receive a removable access plug (not shown) able to provide access to the interior cavity 116 so that any fluid inside the check valve 100 can be drained out by use of a buffering device 300, which can also be an external backflow device or a hold-open device, able to manually open the closing member 200 or upon removal of the buffering device 300 allow draining of the fluid out of the check valve 100.

The valve body 110 can comprise a valve cover 120 that can be separate from a main portion 115 of the valve body 110 and attached to the main portion 115 with a plurality of fasteners. In one aspect, the valve cover 120 can comprise an outer surface, an inner surface, a boss, a boss cover, and a plurality of mounting fasteners. The valve cover 120 can define a plurality of mounting holes for mounting the boss cover with a plurality of boss cover fasteners. In another aspect, the boss cover can be replaced with a mechanical position indicator (not shown) or other check valve accessory and can be removed to allow access to the interior of the check valve 100. In yet another aspect, the boss, the boss cover, and the boss cover fasteners may not be present on the valve cover 120.

A gasket 127 can be positioned between the main portion 115 and the valve cover 120 to facilitate a tight seal between the main portion 115 and the valve cover 120. The gasket 127 can define holes (not shown) to provide clearance for fasteners. The gasket 127 can additionally define holes that provide clearance for movement of parts of a valve position indicator (not shown), which in some installations as previously noted can be mounted to the boss of the valve cover 120. The valve position indicator can indicate the position of the closing member 200 of the check valve 100—whether the check valve 100 is open or closed or somewhere in between. The gasket 127 can be made from a rubber such as, for example and without limitation, Buna-N rubber (i.e., nitrile), ethylene propylene diene (EPDM) rubber, or silicone.

Components of the check valve 100, including the valve body 110 and the valve cover 120, can be made from, for example and without limitation, ductile iron or an equivalently suitable iron material. Any portion of the check valve 100 including the valve body 110 or the buffering device 300 can also be made from another material or a combination of other materials including steel (including stainless steel), copper, bronze, brass, plastic (including fiber-reinforced plastic), or an equivalently suitable material including that which is corrosion-resistant as desired for corrosive environments.

As shown in FIG. 2, the valve body 110 can further comprise a recess 125 positioned proximate to a portion of the port shoulder surface 131 in which a hinge portion 220 of the resilient body 210 of the closing member 200 is configured to be fixedly mounted. The valve body 110 can extend along a longitudinal axis 109 of the valve body 110 defined between the inlet 170 and the outlet 180. The port shoulder surface 131 can be angled with respect to the longitudinal axis 109 by an angle 117 measuring between 0 and 90 degrees. For example and without limitation, the angle 117 can be about 45 degrees. Where the port shoulder surface 131 is angled with respect to the longitudinal axis 109 by the angle 117, the recess 125 can be positioned upstream from the port shoulder surface 131.

The closing member 200 is shown in solid lines in FIG. 2 in an open position B and is shown in broken lines in FIG. 2 in a closed position A and in an intermediate position C. In one aspect, as shown, the closing member 200 can comprise the resilient body 210. In another aspect, the closing member 200 need not comprise any resilient structure. As shown in FIG. 1, the resilient body 210 can be a monolithic body comprising the proximal hinge portion 220, an intermediate portion 230, and a distal flap portion 240. The resilient body 210 can extend from the hinge portion 220 to the intermediate portion 230 to the flap portion 240. The resilient body can comprise a stopper 208. As described above, the hinge portion 220 can be configured to fixedly mount in the valve body 110. Where the closing member 200 of a valve or its equivalent opens differently or has a different pivot position, material, or other structure, the closed position A, the open position B, and the intermediate position C can correspond to a closed position, an open position, and an intermediate position for such valve.

The closing member 200 can be a flapper. As will be described, the flapper can rotate about a single pivot point or hinge point to selectively cover an opening, such as the port 130, within the check valve 100 to close the check valve 100, or the flapper can, in other aspects, rotate in other ways such as through the use of a linkage system which includes both rotational and translational motion. The flapper can be formed from a material that is at least partly resilient or flexible. The closing member 200 can also be a disc formed from a completely rigid material or a combination of rigid and resilient or flexible materials. In some aspects, a flapper can be a disc, also known as a "flapper disc" or a "disc flapper." The flapper disc can be an encapsulated disc that is rigid and is enclosed by a resilient or flexible material such as rubber. A flapper or a disc can be substantially planar in shape. A flapper or a disc can, for example and without limitation, be circular or comprise circular elements when viewed while facing its upstream or downstream surface. The closing member 200 can also be, for example and without limitation, a ball or any other structure that is configured to cover an internal opening in the check valve 100 to close the valve and to move away from the internal opening to open the valve.

As shown in FIG. 2, the intermediate portion 230 and the flap portion 240 together can define an upstream surface 211 and a downstream surface 212. The intermediate portion 230 can define an upstream surface 231 and a downstream surface 232 and the flap portion 240 can define an upstream surface 241 and a downstream surface 242. The upstream surface 211 can comprise the upstream surfaces 231 and 241 and the downstream surface 212 can comprise the downstream surfaces 232 and 242. As shown, the flap portion 240 can be, for example and without limitation, substantially round or circular in shape and having a thickness. The flap portion 240 as well as the resilient body 210 overall can be fabricated from a polymeric material such as, for example and without limitation, Buna-N (i.e., nitrile), ethylene propylene diene (EPDM) rubber, urethane, and other resilient materials. The process used to form the resilient body 210 can be a molding process such as, for example and without limitation, a compression molding process.

The downstream surface 212 of the resilient body 210 can define a first step 213 (shown in FIG. 1) at a transition from the intermediate portion 230 to the flap portion 240. The upstream surface 211 of the resilient body 210 can define a second step 214 at the transition from the intermediate portion 230 to the flap portion 240.

The closing member 200 can comprise a hinge pin 205 and a stiffening insert 250 wrapped with a reinforcement strap 260 and encapsulated within the resilient body 210. The hinge pin 205 can help the hinge portion 220 of the resilient body 210 keep its shape when sandwiched between the valve body 110 and the valve cover 120, while the stiffening insert 250 can help keep the flap portion 240 of the resilient body 210 flat under pressure and during opening and closing of the check valve 100. The reinforcement strap 260 can couple the stiffening insert 250 to the hinge pin 205 and can wrap at least partially around the stiffening insert 250 and the hinge pin 205. As shown in FIG. 1, however, the closing member 200 need not comprise the hinge pin 205, the stiffening insert 250, or the reinforcement strap 260. The stiffening insert 250 and the hinge pin 205 can be made from a steel such as, for example and without limitation, hot-rolled steel. The stiffening insert 250 or the hinge pin 205 can also be made from another metal, a polymer, or any rigid material or from a combination of two or more of these materials. For example and without limitation, the reinforcement strap 260 can be made from a cloth such as fiberglass cloth or from a nylon material or other flexible material having similar mechanical properties. The reinforcement strap 260 can also be made from another material or combination of materials with a tensile strength and other properties resulting in the reinforcement strap 260 being able to prevent resilient body 210 from stretching or deforming over time.

As shown in FIG. 2, the buffering device 300 can hold open the closing member 200 at the intermediate position C, which is located between the closed position A and the open position B. The buffering device 300 can be made to hold the closing member 200 in any position or can be adjusted so that it does not contact the closing member 200 even when the closing member 200 is in the closed position A. The buffering device 300 can comprise a housing 310, a rod 320, a nut 330, a handle 340, an O-ring (not shown), and a wiper ring (also not shown). Both the O-ring and the wiper ring can be positioned inside the housing 310 between the rod 320 and the housing 310 and can be configured to prevent leakage of fluid out of the interior cavity 116 of the check valve 100 through the buffering device 300. The housing 310 can comprise a sheath portion 312 to conceal and/or guide the rod 320, a threaded portion 314 to secure the buffering device 300 to the valve body 110, and a hex portion 316 to facilitate assembly of the buffering device 300 to the check valve 100. The threaded portion 314 can define, for example and without limitation, male NPT threads sized to be received within the access port 201, which can define female NPT threads or any other matching thread configuration.

The rod 320 can comprise a first end 325 proximate to the closing member, a second end 326 distal from the first end 325, and a threaded portion 323 that when rotated as part of the rod 320 can cause the rod 320 to move in one direction or another along an axis 301 of the buffering device 300. The rod 320 and the housing 310 of the buffering device 300 can be positioned at least partially inside the valve body 110. The handle 340, which can be sized to fit within a bore (not shown) defined in the second end 326 of the rod 320, can be used to produce such movement of the rod 320 along the axis 301. By such movement, produced by manipulation of the second end 326 of the rod 320 from outside the valve body 110 by rotation of the handle 340, a distance from the first end 325 of the rod 320 to the closing member 200 can be adjusted. An axial outermost surface or tip of the first end 325 of the rod 320 can face the upstream surface 211 of the closing member 200. As shown, the rod 320 can extend the full length of the buffering device 300 along the axis 301 from the first end 325 to the second end 326.

Figure 3:
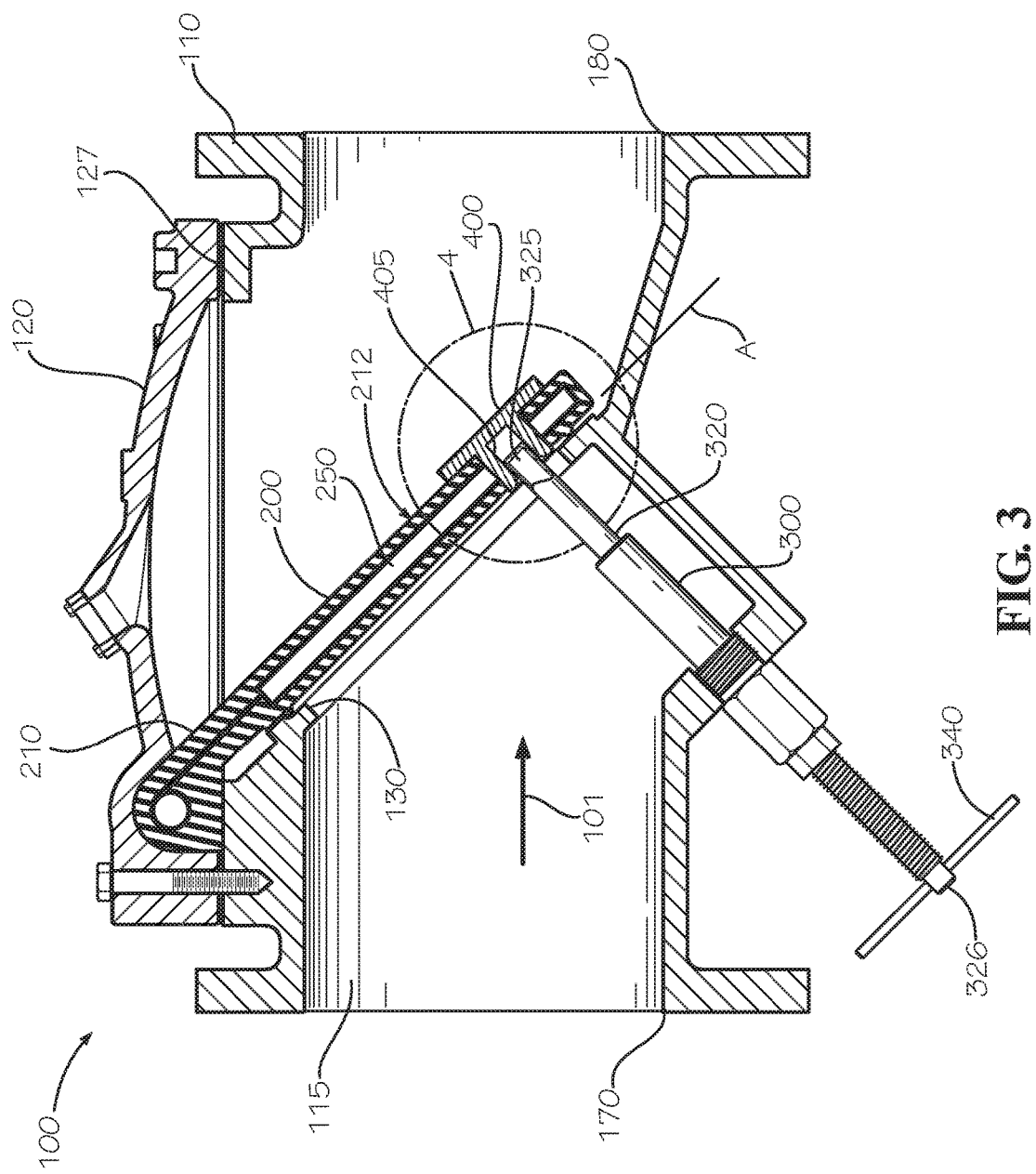
FIG. 3 is a sectional view of the check valve of FIG. 1 taken along line 2-2 of FIG. 1 in accordance with another aspect of the current disclosure wherein a buffer is mounted on the flapper.
Figure 4:
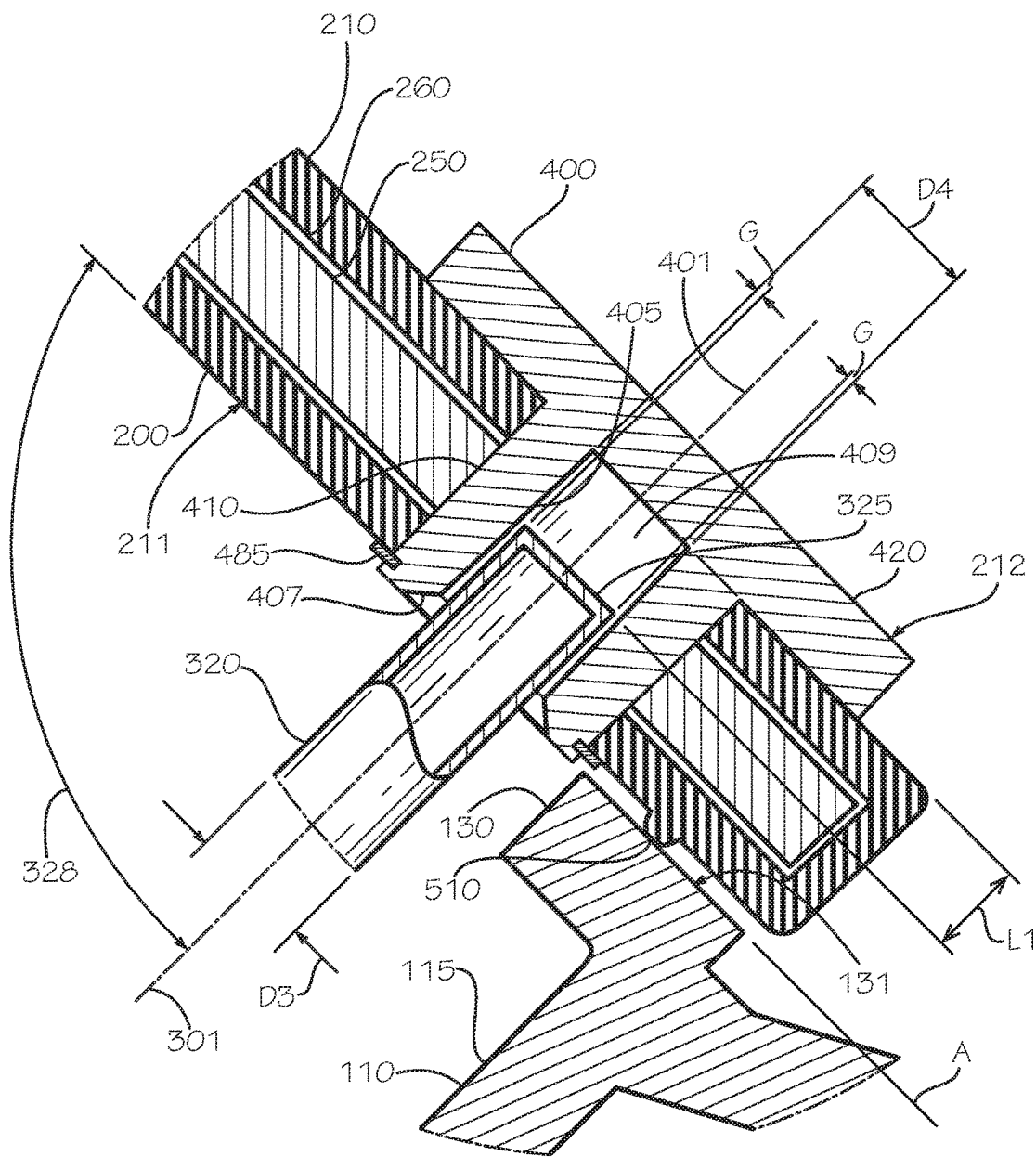
FIG. 4 is a detail view of the check valve of FIG. 3 taken from detail 4 of FIG. 3 showing the flapper in a closed position.
Figure 9:
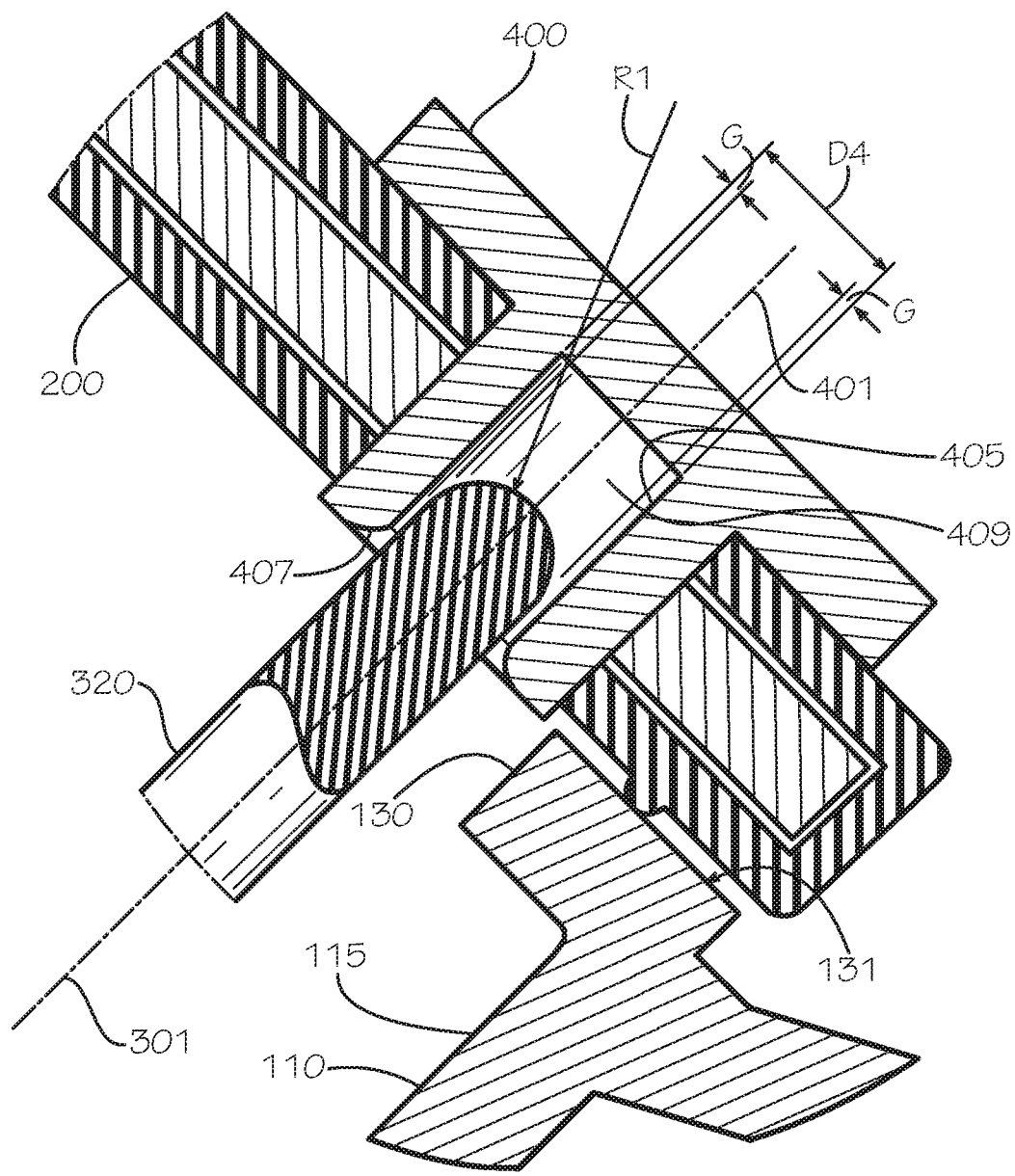
FIG. 9 is a detail view of the check valve of FIG. 3 taken from detail 4 of FIG. 3 in accordance with another aspect of the current disclosure showing the flapper in a closed position.

As shown in FIGS. 3 and 4, the closing member 200 can comprise a buffer 400 and the rod 320 of the buffering device 300 can be configured to interact with the buffer 400 to cushion the closing movement of the closing member 200. More specifically, the buffer 400 and the rod 320 can be sized and positioned such that the rod 320 is received within a bore 405 of the buffer 400. The buffer can comprise a body 410 (shown in FIG. 4) and a flange 420 (shown in FIG. 4). In one aspect, as shown, the flange 420 can be adjacent to and in contact with the downstream surface 212 of the resilient body 210. In another aspect, the flange 420 can be moved to an opposite end of the buffer 400—adjacent to and in contact with the upstream surface 211 of the resilient body 210—and sized and shaped to not interfere with the rib 510 of the resilient body 210 or the port 130. The body 410 can define the bore 405 defining an axis 401 (shown in FIG. 4) and an opening 407 (shown in FIG. 4), which can be chamfered, radiused, or otherwise shaped to define a larger radius at an axial end of the buffer 400 to more readily allow entrance of the rod 320. In one aspect, the first end 325 of the rod 320 can be flat as shown. In another aspect, as shown in FIGS. 2 and 9, the first end 325 of the rod 320 can be rounded. In one aspect, the rod 320 can be hollow in construction as shown. In another aspect, the rod 320 can be solid as shown in FIG. 9.

As shown in FIG. 4, a diameter D3 of the first end 325 of the rod 320 can be sized slightly smaller than a diameter D4 of the bore 405, thereby defining a gap G between the rod 320 and the bore 405. As the closing member 200 approaches the closed position A, with the fluid inside the interior cavity 116 (shown in FIG. 2) of the valve body 110, the rod 320 can push against the fluid that is already inside the bore 405 of the buffer 400 and together with the bore 405 define a buffer inner chamber 409. The buffer inner chamber 409 can together with the rod 320 define the diameter D4 and a chamber length L1. The gap G also places the buffer inner chamber 409 into fluid communication with the interior cavity 116 even when the first end 325 of the rod 320 enters the opening 407. By adjusting the dimensions of the buffer 400 or the rod 320, the gap G or the chamber length L1 can be adjusted or set to control the rate at which fluid that can escape or "bleed" from the buffer inner chamber 409. As a result, the volume of fluid trapped and the resulting force exerted by the fluid in the buffer inner chamber 409 against the first end 325 of the rod 320 can be adjusted to decelerate the closing member 200 at a higher or lower rate as desired. By adjusting the deceleration of the closing member 200, valve "slam" caused by rapid closing of the closing member 200 against the port 130 can be reduced or eliminated.

As shown, the rod 320 or the axis 301 of the buffering device 300 can be positioned at an angle 328 with respect to the closing member 200, or vice versa. In one aspect, the angle 328 can be approximately 90 degrees. In another aspect, the angle 328 can be more than or less than 90 degrees. In one aspect, the bore 405 of the buffer 400 can be drafted or angled such that the diameter D4 is larger at a point proximate to the opening 407 and smaller at a point distal from the opening 407. In another aspect, as shown in FIG. 9, the bore 405 of the buffer 400 can have straight sides and the diameter D4 can be constant.

Figure 5:
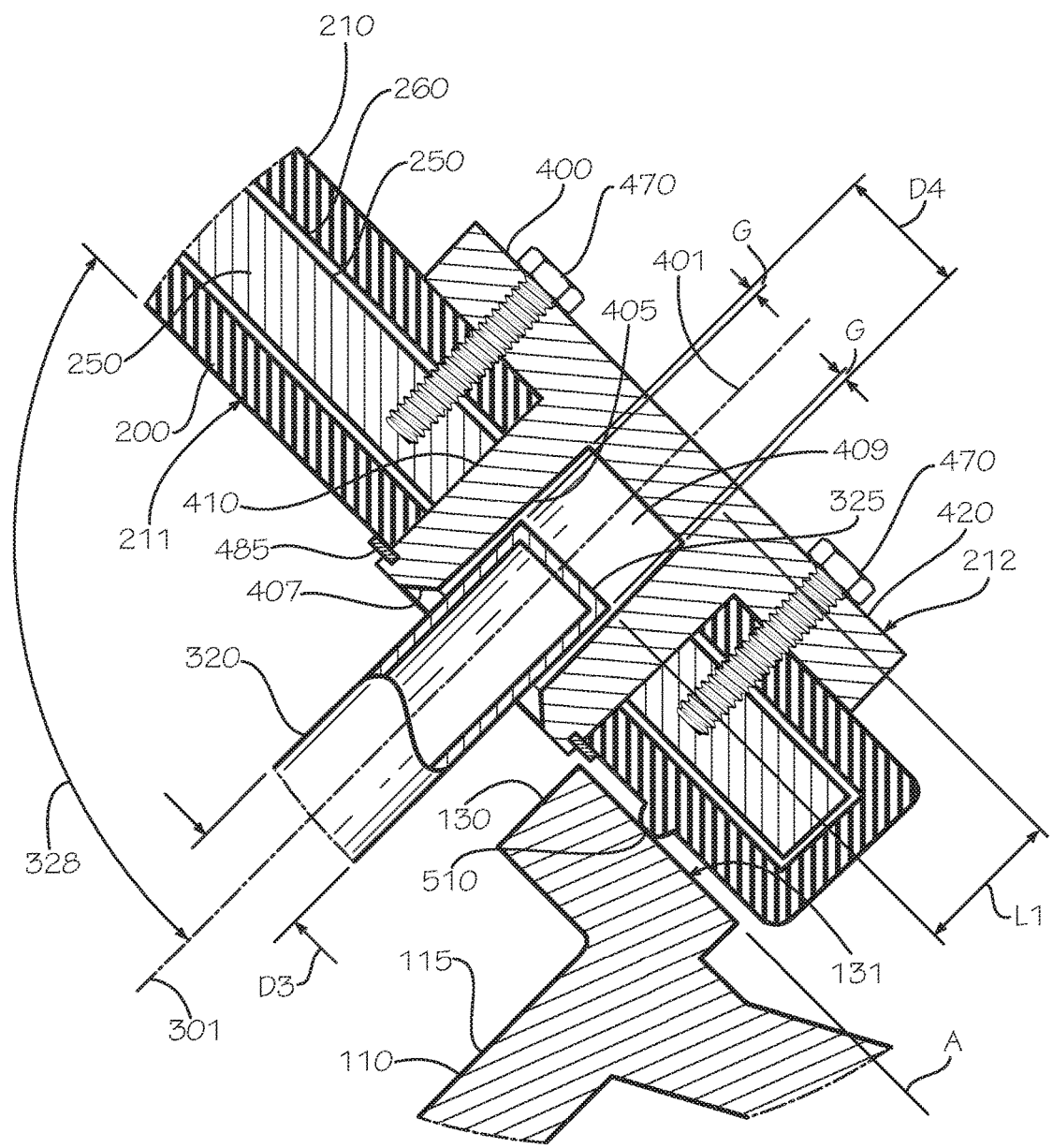
FIG. 5 is a detail view of the check valve of FIG. 3 taken from detail 4 of FIG. 3 in accordance with another aspect of the current disclosure showing the flapper in a closed position.

In one aspect, as shown, the buffer 400 can be coupled or assembled to the closing member 200 by using, for example and without limitation, a separate fastener or by an interference fit, welding, or adhesive (not shown). More specifically, the fastener used to assemble the buffer 400 to the closing member can be a retaining fastener 485. In another aspect, as shown in FIG. 5, the fastener used to assemble the buffer 400 to the closing member can be a fastener 470, which can be, for example and without limitation, a bolt or a screw. In yet another aspect, the buffer 400 can be coupled or assembled to the closing member 200 with a plurality of fasteners 470.

Figure 6:
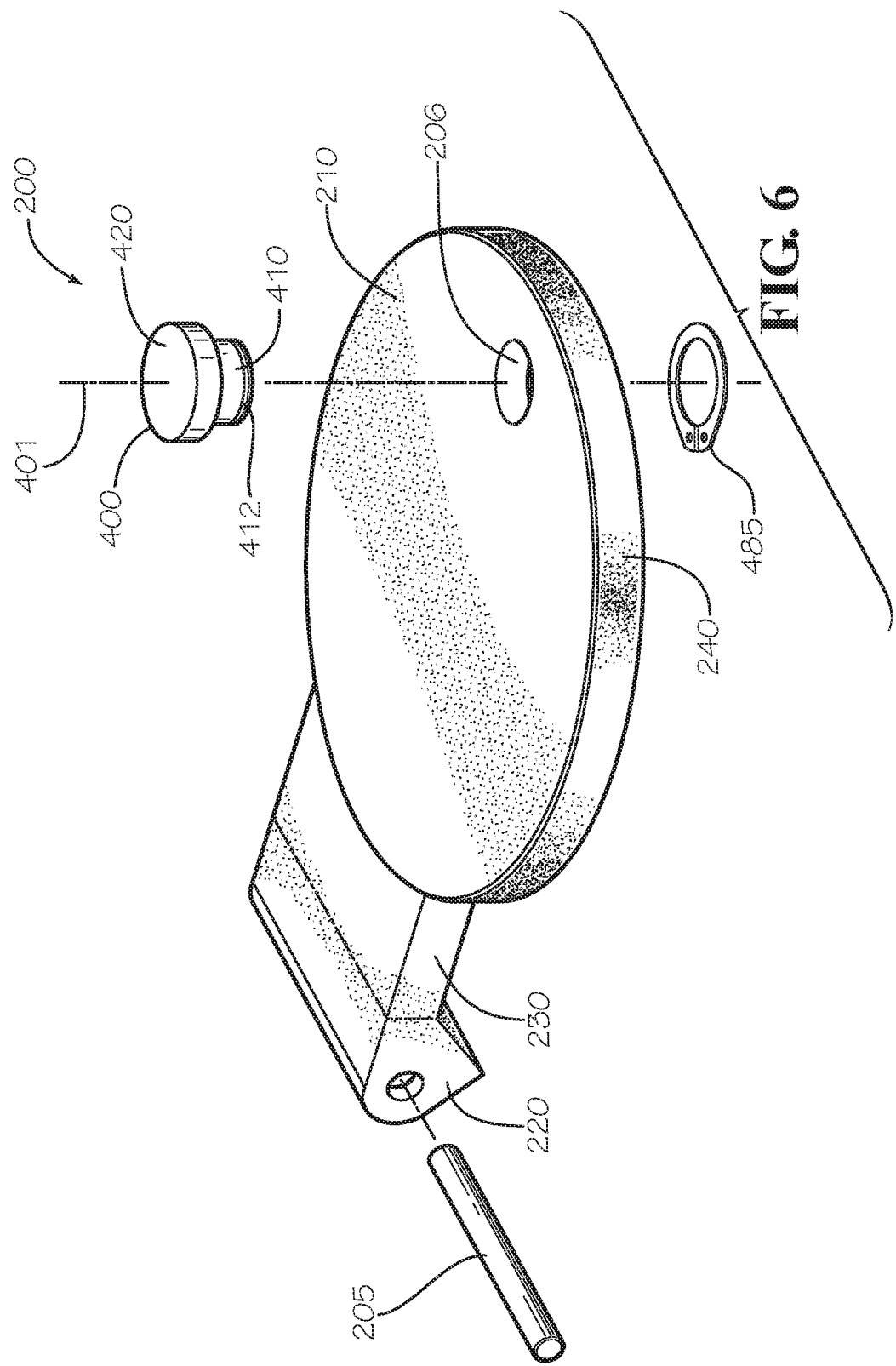
FIG. 6 is an exploded view of the flapper of FIG. 3.

As shown in FIG. 6, the buffer 400 can incorporate the function of the stopper 208 or, as described, can be used to cushion the movement of the closing member 200 from the open position B towards the closed position A. More specifically, the buffer 400, which can be made to resemble a flanged bushing due to the presence of the flange 420, can be inserted inside—or itself form during the manufacturing process—a bore 206 defined in the flapper 200. In another aspect, the buffer 400 can be formed integrally with the resilient body 210 or, as will be described, with the stiffening insert 250. The buffer 400 can be mounted on the flapper 200 and can thereby not be coupled to any other portion of the check valve 100. The buffer 400 can define a groove such as an annular groove 412, which can be sized to receive the retaining fastener 485 after assembly of the buffer 400 to the flapper 200.

As previously described, the hinge portion 220 can comprise the hinge pin 205. The hinge portion 220 of the closing member 200, however, need not rotate about the hinge pin 205 to be considered a hinge portion. In addition, neither the hinge portion 220 nor the hinge pin 205 need to rotate with respect to the valve body 110 during operation. The hinge portion 220 of the closing member 200 can be shaped so as to fill and remain stationary inside the recess 125 of the valve body 110.

Figure 7:
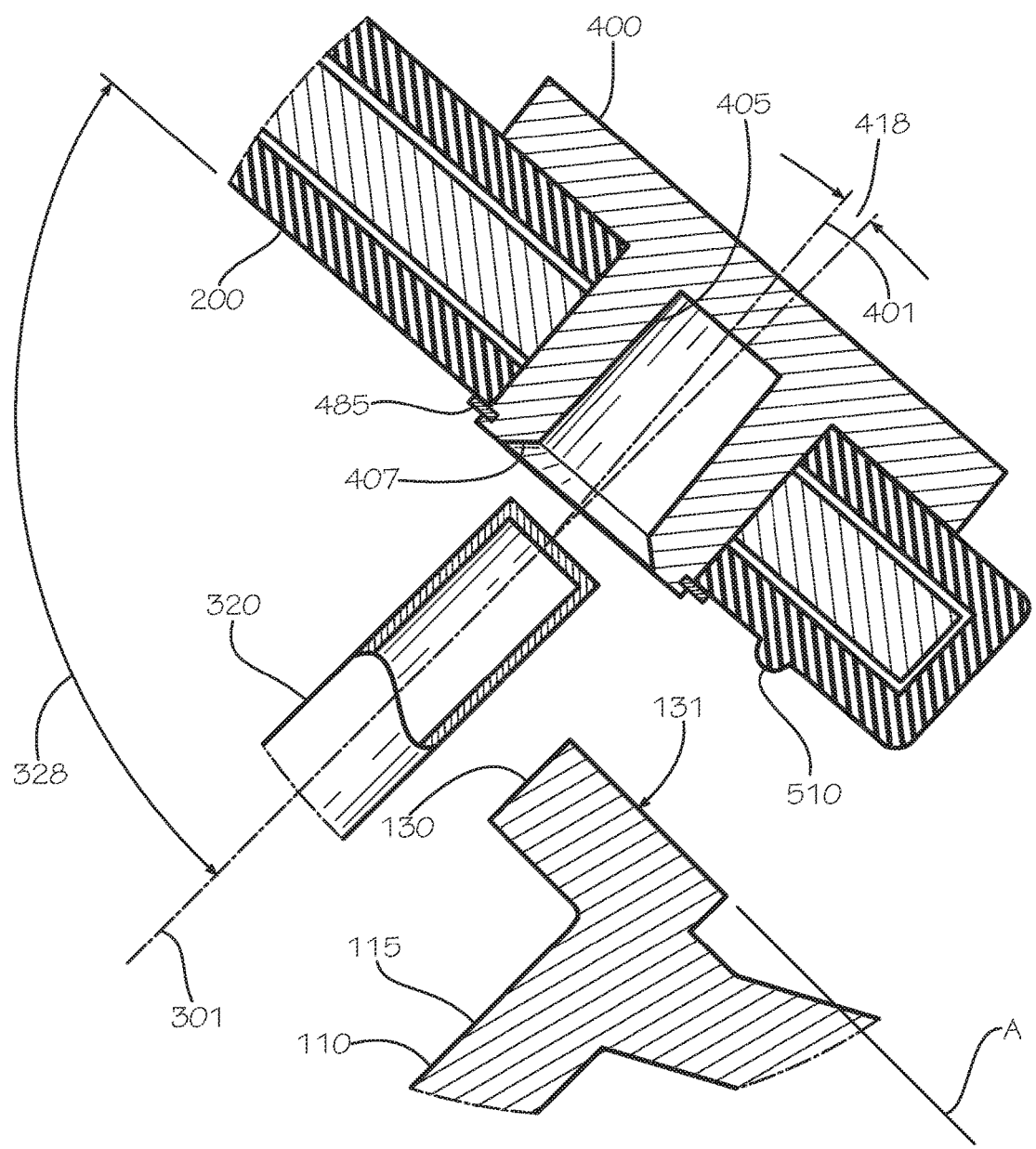
FIG. 7 is a detail view of the check valve of FIG. 3 showing the flapper in an open position.

The angle 328 at which the closing member 200 is angled with respect to the rod 320 can be smaller or larger when the closing member 200 is open than when the closing member 200 is in contact with the port shoulder surface 131 of the port 130, depending on the orientation of the closing member 200. As shown in FIG. 7, an angle 418 at which the axis 401 of the buffer 400 can be angled with respect to the axis 301 of the buffering assembly 300 or the rod 320 can likewise be smaller or larger when the closing member 200 is open than when the closing member 200 is in contact with the port shoulder surface 131 of the port 130. As shown in FIG. 7, the angle 328 can be smaller and the angle 418 can be larger when the closing member 200 is in the open position B, the intermediate position C, or any other position compared to when it is in the closed position A.

Figure 8:
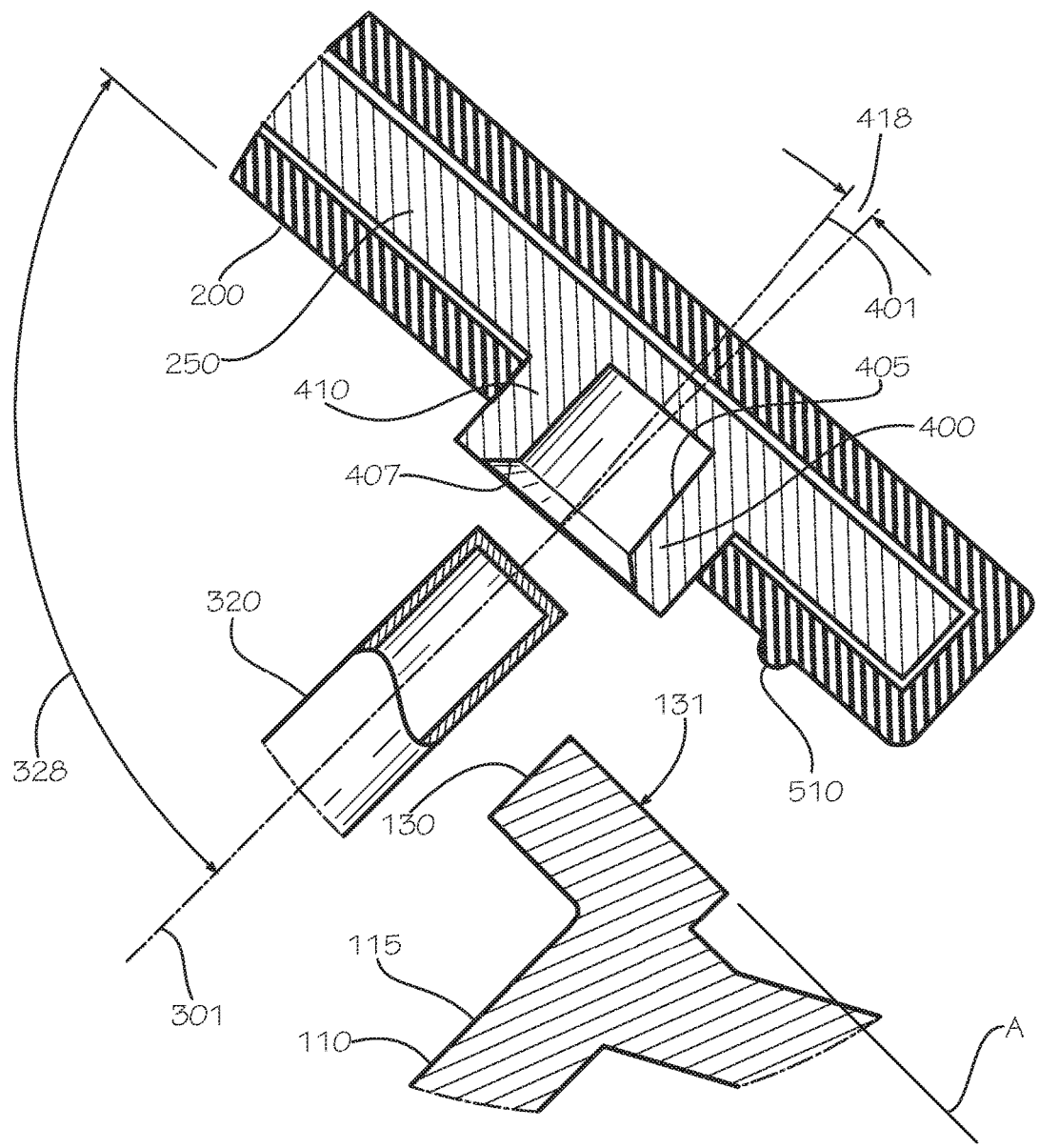
FIG. 8 is a detail view of the check valve of FIG. 3 in accordance with another aspect of the current disclosure showing the flapper in an open position.

As shown in FIG. 8, the buffer 400 can be formed integrally from the stiffening insert 250. In such aspect, the flange 420 may not be visible but the body 410 can still define the bore 405 and the opening 407. In such case, neither the fasteners 485, 470 nor any other fastening method is required to hold the buffer 400 in place with respect to the closing member 200.

As shown in FIG. 9, the rod 320 can have a rounded end defining a radius R1 and as previously described can be solid in construction. As shown, the opening 407 to the buffer 400 can also be radiused as shown to facilitate entry of the rod 320. Also as previously noted, the walls of the bore 405 can be straight and the resulting diameter D4 can be constant as shown. In one aspect, when desired or necessary due to an increased angle 418 resulting from a distance of the pivot point such as the hinge pin 205 of the closing member 200 from the buffer 400 being smaller, the walls of the bore 405 can be flared or tapered more significantly so as not to interfere with the rod 320. In another aspect, the rod 320 can be bent to approximately or exactly match the path of movement of the axis 401 of the buffer 400 during closure of the closing member 200.

Figure 10:
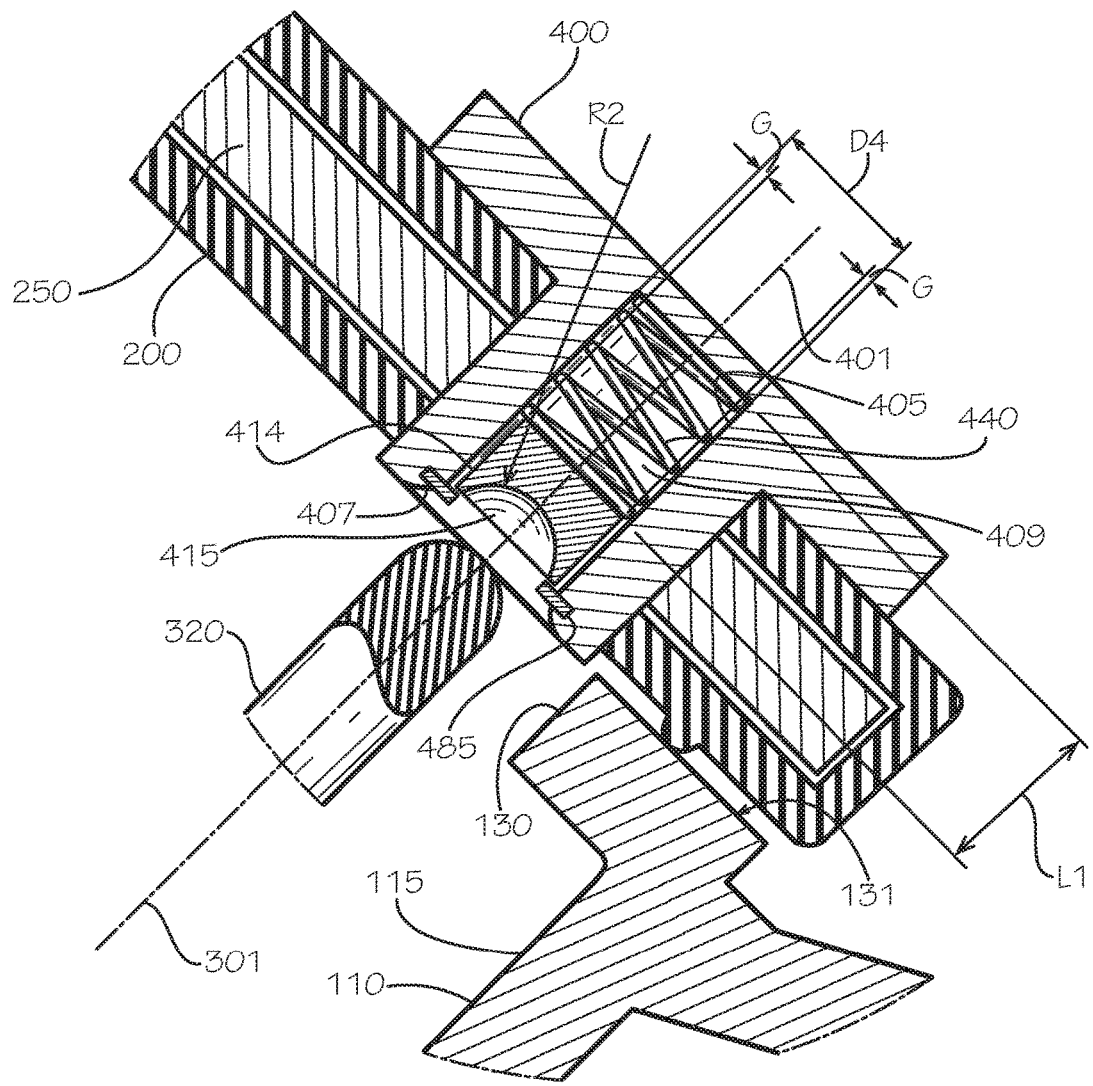
FIG. 10 is a detail view of the check valve of FIG. 3 taken from detail 4 of FIG. 3 in accordance with another aspect of the current disclosure showing the flapper in a closed position.

FIG. 10 shows the rod 320 retracted away from where it would contact another aspect of the buffer 400 to show more clearly the structure of the buffer 400. In such aspect, the buffer 400 can comprise a body 410, a biasing element 440, a fastener 485, and a buffer piston 414 received within the bore 405 of the body 410 and configured to move along the axis 401 between the fastener 485 and the biasing element 440 as the biasing element either compresses or expands due to contact with or separation from the rod 320 as the closing member 200 closes or opens, respectively. The buffer 400 is shown with the biasing element 440 fully expanded or extended as it would be positioned before contact of the buffer 400 with the rod 320. As shown, a cavity 415 defined in the buffer piston 414 can define a radius R2 and can be shaped to complement the shape of the tip of the rod 320. In one aspect, the value of the radius R2 can be substantially equal to the value of the radius R1. In another aspect, the value of the radius R2 can be greater than the value of the radius R1 or the cavity can define a flat bottom or not be present at all. In yet another aspect, the cavity 415 can comprise tapered or flared walls so as not to interfere with the rod 320 during closing of the closing member 200.

The closing member 200 comprising the buffer 400 can be made a "drop-in" replacement for any other closing member used in the check valve 100 without the need to replace the buffering device 300 or any other component of the check valve 100. Moreover, the buffer 400 can be used in combination with a buffer (not shown) incorporated into the rod 320 such that both the buffer 400 on the closing member 200 and the buffer on the rod 320 both have inherent cushioning properties.

A buffering device 300 in the form of a hold-open device is not required per se. For example and without limitation, the rod 320 can be incorporated into the port 130 or some other portion of the check valve 100, or the rod 320 can be installed in the access port 201 but without all of the features of the buffering device 300 described herein.

A method of using a check valve 100 in a fluid system comprising a fluid can comprise moving a closing member 200 positioned inside the interior cavity 116 of the check valve 100 toward the open position B, moving the closing member 200 of the check valve 100 toward the closed position A, and stopping movement of the closing member 200 when the closing member 200 is in a position proximate to the closed position A with the buffer 400 configured to hold a portion of the fluid and mounted on the closing member 200.

The method can further comprise cushioning movement of the closing member 200 from the open position B to the closed position A when the closing member 200 is proximate to the closed position A. The method of stopping movement of the closing member 200 can comprise moving fluid from the buffer inner chamber 409 to a portion of the interior cavity 116 of the valve body 110 that is outside the buffer 400. The method of stopping movement of the closing member 200 can comprise inserting the rod 320 of the buffering device 300 into the buffer 400. In one aspect, the method can comprise contacting the buffer 400 of the closing member 200 with the rod 320. In another aspect, the method can further comprise contacting the buffer piston 414 of the buffer 400 with the rod 320. The method can further comprise opening or moving the closing member 200 and decompressing the biasing element 440 such that the buffer piston 414 of the buffer 400 moves toward an extended position. The method can further comprise moving the buffer piston 414 of the buffer 400 from an extended position to a retracted position. The method of cushioning movement of the closing member 200 from the open position B to the closed position A can comprise using the fluid in the buffer inner chamber 409 of the buffer 400 to cushion movement of the buffer 400, thereby cushioning movement of the closing member 200.

In various aspects, the buffer 400 cannot leak because the fluid used inside the buffer 400 for buffering can be simply the fluid being stored and/or transported inside the fluid system comprising the check valve 100. When the buffering device 300 uses a fluid other than that the fluid inside the fluid system (for example, air, hydraulic fluid, or oil instead of water), such a fluid must sometimes be kept separated to avoid degradation in performance or failure altogether of the check valve. In addition, the degree of buffering of the closing member 200 can be made infinitely variable in that each rotation in a clockwise (CVV) or counterclockwise (CCVV) direction can increase or decrease the amount of fluid to "bleed down" from the buffer inner chamber 409. In addition, the buffering device 300 can still function as any hold-open device (for example, to be able to drain the line through the access port 201 shown in FIG. 2) by holding the closing member 200 and therefore the check valve open by any degree as desired.

The advantages of various aspects of the check valve 100 and in particular the buffer 400 described herein can include reduction or elimination of valve slam caused by forceful closing of the closing member 200, a flow increase due to reduced CV losses caused by stiff-acting return springs (not shown), leak prevention due to the elimination of bottom buffer or side buffer hydraulic cylinders sometimes used on currently available check valves by others, infinitely adjustable metering with the buffering device 300, and multi-purpose use of the buffering device 300. In addition, the check valve 100 disclosed herein can be produced much less inexpensively than currently available check valves using an air, hydraulic, or oil cushion cylinder assembly.

As described above, when a pump positioned upstream from a check valve 100 in a fluid system shuts down, any delay between when the pump stops pushing the fluid and when the check valve is fully closed can allow the fluid to flow in reverse. This reverse flow can cause the closing member 200 or its equivalent to slam closed, resulting in "water hammer" that the buffer 400 disclosed herein is configured to reduce or eliminate. In one aspect, even cushioning the closing member 200 just before closure, such as in the last 10% of closure—without necessarily increasing the speed of closure of the closing member 200, can reduce or eliminate water hammer. In another aspect, cushioning the closing member 200 when the closing member 200 is already more than 90% closed relative to the open position B can reduce or eliminate water hammer. In yet another aspect, cushioning the closing member 200 when the closing member 200 is less than 90% closed relative to the open position B can reduce or eliminate water hammer.

As described above, a check valve 100 can be not only a valve described as a check valve such as a flapper check valve but also any valve that regulates flow of a fluid including the aforementioned swing check valves and tilting or slanting disc check valves. The buffer 400 can be mounted in a myriad of ways and in orientations contemplated by the disclosure but not explicitly shown. In another aspect, the systems and methods disclosed herein can work with a metal to metal seat as well, such as when both a valve-closing element such as valve disc and a seat or a seat ring against which the valve disc seats are both formed from metal or comprise metal.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A check valve for a fluid system, the check valve comprising:
    a valve body defining an inlet, an outlet, and an interior cavity extending from the inlet to the outlet;
    a flapper positioned inside the interior cavity, the flapper movable between an open position, providing fluid communication between the inlet and outlet, and a closed position, isolating the inlet from the outlet, the flapper comprising a stiffening insert encapsulated by a resilient body, the flapper defining an upstream surface and a downstream surface, a portion of the upstream surface defined by the resilient body forming a seal within the interior cavity in the closed position;
    a rod positioned at least partially inside the valve body and comprising a first end proximate to the flapper and a second end distal from the first end, the rod extending through the valve body, the rod positioned at an angle with respect to the flapper, a distance from the first end of the rod to the flapper adjustable by manipulation of the second end of the rod from outside the valve body, an axially outermost portion of the first end of the rod relative to an axis defined by the rod facing the upstream surface of the flapper; and
    a buffer mounted on the flapper and configured to move with the flapper, the buffer comprising a body and a flange, the body extending through the stiffening insert and the resilient body of the flapper, the body defining a bore sized to receive the first end of the rod, the buffer configured to hold a portion of fluid of the fluid system and cushion movement of the flapper from the open position to the closed position when the flapper is proximate to the closed position, the bore configured to receive the first end of the rod as the flapper approaches the closed position.

2. The check valve of claim 1, further comprising a buffering device, the buffering device comprising a housing and the rod, the housing secured to the valve body and the rod positioned at least partially inside the housing.

3. The check valve of claim 1, wherein the buffer comprises a buffer piston positioned inside the bore of the buffer, the buffer piston movable inside the bore between an extended position and a retracted position.

4. The check valve of claim 3, wherein the buffer comprises a biasing element configured to maintain the buffer piston of the buffer in the extended position when the buffer piston is not in contact with the rod.

5. The check valve of claim 4, wherein:
    the first end of the rod contacts the buffer piston within the bore when the flapper is in the closed position;

the rod positions the buffer piston in the retracted position when the flapper is in the closed position; and the biasing element is compressed when the flapper is in the closed position.

6. The check valve of claim 1, wherein:

the first end of the rod and the bore define a buffer inner chamber when the first end of the rod is received within the bore;

a gap is defined between the rod and the bore;

the gap connects the buffer inner chamber in fluid communication with the interior cavity; and the gap is sized to control a rate at which the fluid escapes from the buffer inner chamber.

7. The check valve of claim 1, wherein:

the body of the buffer defines an opening to the bore; and the opening is chamfered.

8. The check valve of claim 1, wherein:

the body of the buffer defines an opening to the bore; and the opening is radiused.

9. The check valve of claim 1, wherein:

the flange of the buffer engages the downstream surface of the flapper;

a retaining fastener engages the body of the buffer; and the retaining fastener engages the upstream surface of the flapper.

10. The check valve of claim 1, wherein:

the flange of the buffer engages the downstream surface of the flapper; and a fastener extends through the flange and into the flapper to secure the buffer to the flapper.

11. The check valve of claim 1, wherein the first end of the rod is removed from the bore when the flapper is in the open position.

12. A check valve for a fluid system, the check valve comprising:

a valve body defining an inlet, an outlet, and an interior cavity;

a closing member positioned inside the interior cavity, the closing member movable between an open position, providing fluid communication between the inlet and outlet, and a closed position, isolating the inlet from the outlet, the closing member comprising a stiffening insert encapsulated within a resilient body;

a buffering device comprising a rod and a housing, the housing attached to the valve body, a first end of the rod extending into the interior cavity, a second end of the rod disposed external to the valve body; and a buffer integrally defined by the stiffening insert of the closing member, a body of the buffer extending through the resilient body, the body of the buffer defining a bore sized to receive the first end of the rod in the closed position, the buffer configured to hold a portion of fluid of the fluid system within a buffer inner chamber and cushion movement of the closing member from the open position to the closed position, the buffer inner chamber defined between the bore and the first end of the rod when the rod is received within the bore.

13. The check valve of claim 12, wherein the buffer inner chamber of the buffer is in fluid communication with the interior cavity of the valve body.

14. A method of using a check valve in a fluid system comprising a fluid, the method comprising:

moving a closing member positioned inside an interior cavity of the check valve toward an open position, the open position providing fluid communication between an inlet and an outlet of the check valve, the check valve comprising a valve body defining the inlet, the outlet, and the interior cavity;

moving the closing member of the check valve toward a closed position;

receiving a first end of a rod within a bore defined by a buffer as the closing member approaches the closed position, the rod secured to valve body, the buffer secured to the closing member; and stopping movement of the closing member when the closing member is in a position proximate to the closed position with the buffer, the buffer configured to hold a portion of the fluid within a buffer inner chamber defined between the bore and the first end of the rod when the rod is received within the bore.

15. The method of claim 14, further comprising cushioning movement of the closing member from the open position to the closed position when the closing member is proximate to the closed position.

16. The method of claim 14, wherein stopping movement of the closing member comprises moving fluid from the buffer inner chamber to a portion of the interior cavity of the valve body that is outside the buffer.

17. The method of claim 16, wherein moving fluid from the buffer inner chamber to a portion of the interior cavity of the valve body comprises passing fluid through a gap defined between the bore and the first end of the rod when the rod is received within the bore.

18. The method of claim 17, further comprising sizing the gap to control a rate at which the fluid escapes from the buffer inner chamber.

19. The method of claim 14, further comprising contacting the buffer of the closing member with the rod.

20. The method of claim 14, wherein the buffer further comprises a biasing element, the method further comprising opening the closing member and decompressing the biasing element such that a buffer piston of the buffer moves toward an extended position.

21. The method of claim 20, further comprising moving the buffer piston of the buffer from the extended position to a retracted position.

22. The method of claim 21, further comprising contacting the first end of the rod to the buffer piston within the bore.

* * * * *